United States Patent [19]

Mochizuki

[11] Patent Number: 4,812,497

[45] Date of Patent: Mar. 14, 1989

[54] ANAEROBICALLY CURABLE COMPOSITION HAVING A GOOD STABILITY

[75] Inventor: Shuji Mochizuki, Hachioji, Japan

[73] Assignee: Three Bond Co. Ltd., Tokyo, Japan

[21] Appl. No.: 119,234

[22] Filed: Nov. 4, 1987

Related U.S. Application Data

[63] Continuation of Ser. No. 840,314, Mar. 14, 1986, abandoned.

[30] Foreign Application Priority Data

Mar. 15, 1985 [JP] Japan ................................. 60-51815

[51] Int. Cl.$^4$ ........................... C08K 5/34; C08F 4/04
[52] U.S. Cl. ..................................... 524/87; 524/413; 524/427; 524/430; 524/433; 524/715; 526/204; 526/219; 252/182.13
[58] Field of Search ................. 524/87, 413, 427, 430, 524/433, 715; 252/401, 182.13; 526/209, 219

[56] References Cited

U.S. PATENT DOCUMENTS

| | | | |
|---|---|---|---|
| 3,378,491 | 4/1968 | Braid et al. | 252/401 |
| 3,413,225 | 11/1968 | Dmuchovsky et al. | 252/401 |
| 4,239,843 | 12/1980 | Hara et al. | 524/89 |
| 4,260,713 | 4/1981 | Tanaka et al. | 526/204 |

FOREIGN PATENT DOCUMENTS

| | | | |
|---|---|---|---|
| 2304270 | 1/1973 | Fed. Rep. of Germany | 524/87 |
| 7203227 | 1/1973 | Japan | 526/180 |
| 0011342 | 1/1984 | Japan | 524/87 |
| 13843 | 1/1985 | Japan | 524/715 |
| 256241 | 11/1969 | U.S.S.R. | 524/715 |

*Primary Examiner*—Kriellion Morgan
*Attorney, Agent, or Firm*—Donald D. Mon; David O'Reilly

[57] ABSTRACT

An anaerobically curable composition having a good stability and suitable for use primarily as an adhesive, which comprises a radically polymerizable acrylate and/or methacrylate monomer, and a naphthyl azoxine. The composition is satisfactorily stable even if a large amount of an inorganic filler is used therein.

9 Claims, No Drawings

ANAEROBICALLY CURABLE COMPOSITION HAVING A GOOD STABILITY

This is a continuation of co-pending application Ser. No. 840,314 filed on Mar. 14, 1986 now abandoned.

BACKGROUND OF THE INVENTION

The present invention relates to an anaerobically curable composition having a good stability which is suitable for use, primarily as an adhesive and more particularly, to such an anaerobically curable composition which is satisfactorily stable even if a large amount of an inorganic filler is used therein.

For the purpose of improving the preservative stability of radically-polymerizable and anaerobically curable compositions for use as an adhesive, various methods have been adopted, for example, the addition of quinones as a stabilizer into such a composition to absorb a free radical (which is described in Japanese Patent Publication No. 6545/68), the addition of a metal chelating agent such as oxalic acid, EDTA or the like as a stabilizer to deactivate metal impurities which may adversely affect the stability (see Japanese Patent Publication Nos. 32751/72 and 20555/76), the use of nitrosophenol as a stabilizer (Japanese Patent Publication No. 45970/81), and the use of a pyridine carboxylic acid as a stabilizer (Japanese Patent Application Laid-open No. 138765/83).

The above anaerobically curable composition usually contains inorganic fillers added therein in order to adjust the viscosity thereof, or to improve the properties of composition cured, for example, chemical resistance, mechanical strength or the like.

However, if a large amount of an inorganic filler is added in a composition, then the above known stabilizer can not provide the effect of a preservative stability, and the composition may be gelled. Therefore, the amount of inorganic filler added has been limited to be at most about 10% by weight.

SUMMARY OF THE INVENTION

It is therefore an object of the present invention to provide an anaerobically curable composition free from the disadvantages found in the prior art, which is satisfactorily stable even if an inorganic filler is added therein an amount of 10% by weight or more.

DETAILED DESCRIPTION

According to the present invention, the above object is accomplished by providing an anaerobically curable composition comprising a radically polymerizable acrylate and/or methacrylate monomer, and a naphthyl azoxine.

The radically polymerizable (meth) acrylate monomers which may be employed in the present invention are compounds terminally having one or more polymerizable ethylenically-double bond(s) and specifically, the following (meth) acrylates (1) to (6): (1) Poly-(meth)acrylates represented by the general formula:

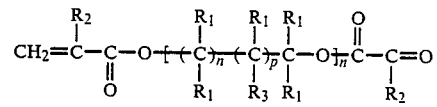

wherein $R_1$ is hydrogen, or selected from the groups consisting of an alkyl group containing 1 to 4 carbon atoms, hydroxyl alkyl containing 1 to 4 carbon atoms, or

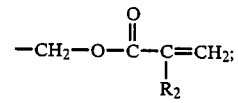

$R_2$ is H or $-CH_3$; and $R_3$ is H or selected from hydroxyl and

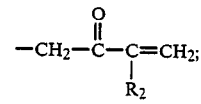

and wherein m is an integer of 1 or more, preferably 1 to 8; n is an integer of 1 or more, preferably 1 to 10; and p is 0 or 1.

Polyacrylate esters characterized by the above general formula include poly-(such as di-, tri and tetra-)ethylene glycol dimethacrylates and diacrylates, neopentyl glycol dimethacrylate, and trimethylol propane trimethacrylate.

(2) Mono-(meth)acrylates represented by the general formula:

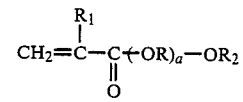

wherein R is an alkylene containing 2 to 4 carbon atoms or a halo-substituted alkylene; $R_1$ is H or $CH_3$; $R_2$ is selected from the group consisting of $-CH_2CH_2OH$, $-CH_2CH_2CH_2OH$,

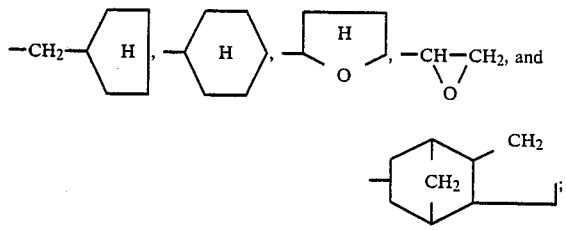

and a is an integer of 0 to 7 inclusive.

(3) (Meth)acrylates represented by the formula:

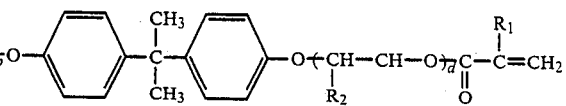

wherein $R_1$ is H or $CH_3$; $R_2$ and $R_3$ are H, an alkyl or alkoxyl group, or a halogen atom; and b and c are an alkylene group containing 1-8 carbon atoms.

(4) Urethane(meth)acrylates having

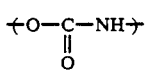

in a molecule.

(5) (Meth)acrylates having, in a molecule, a spiroacetal structure:

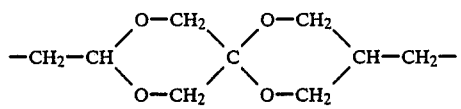

(6) Other monomers such as (meth)acrylates modified by acrylonitrile butadiene or having an acrylonitrile butadiene structure, and (meth)acrylates modified by butadiene or having an epoxy structure.

These acrylates and methacrylates can be used even alone, but it is desirable to properly employ several monomers in combination as desired.

In the composition according to the present invention, an organic proxide may be employed as an initiator. Such organic peroxides include diacyl peroxides, peroxyesters, dialkyl peroxides, hydroperoxides and ketone peroxides. Preferred organic peroxides are hydroperoxides typically such as cumene hydroperoxide, t-butyl hydroperoxide, etc.; dialkyl peroxides including 2,5-dimethyl-2,5-di(t-buthyl peroxy)hexine-3; and cyclic peroxy ketals such as 3,6,6,9,9-pentamethyl-3-(n-butyl)-1,2,4,5-tetraoxycyclononane, 3,6,6,9,9-pentamethyl-3-(sec-butyl)-1,2,4,5-tetraoxycyclononane.

The composition according to the present invention may be polymerized using no organic peroxide. Illustrative of such polymerizations are those using benzoic imides and mercaptanes, as described in Japanese Patent Publication No. 597/76.

The present invention contemplates particularly the use of a naphthyl azoxine as a stabilizer instead of the above-mentioned known quinones or the like. With the use of such a naphthyl azoxine, even if an inorganic filler is added in a composition according to the present invention in an amount of 50% by weight or more, the composition still exhibits a good preservative stability and further, may be rapidly curable to provide a cured material having a high mechanical strength.

The amount of naphthyl azoxine added may be in a range of 0.0005–0.5 parts by weight, preferably 0.001–0.1 parts by weight per 100 parts by weight of an acrylate and/or methacrylate monomer. It should be understood that even when no inorganic filler is incorporated in the composition, naphthyl azoxines exhibit the same effect as with the known stabilizers.

The structure of the naphthyl azoxine is represented by the formula:

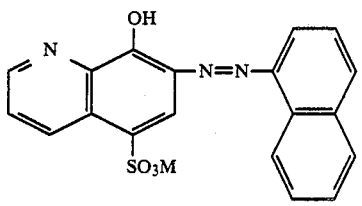

wherein M is H or Na.

It is to be noted that examples of the inorganic fillers are heavy calcium carbonate, alumina, titanium oxide, potassium titanate, talc, etc.

The present invention will now be described in more detail by way of Examples.

EXAMPLE 1

There is prepared a formulation comprising the following composition:

| Component | Part by weight |
| --- | --- |
| 2,2-bis(4-methacryloxy-diethoxy phenyl)propane dimethacrylate | 80 |
| Triethylene glycol dimethacrylate | 20 |
| O—sulfobenzimido | 1 |
| Cumene hydroperoxide | 1 |
| 1,2,3,4-tetrahydroquinoline | 0.5 |
| Heavy calcium carbonate (Whiten-B) | 100 |

Several stabilizers as given in Table 1 were added in the above formulation to make samples, and the stability and curability thereof were determined. These results are given in Table 1, and the results of determination for samples from the formulation free of heavy calcium carbonate are given in Table 2.

TABLE 1

| Sample No. | Stability | Amount of stabilizer added (part by weight) | Setting time | Fracture torque (kg · cm) | Time of gelation at 80° C. | Stability at 50° C. |
| --- | --- | --- | --- | --- | --- | --- |
| 1 | Naphtyl azoxine | 0.005 | less than 10 minutes | 220 | 6 to 8 hours | 10 days or more |
| 2 | Hydroquinone | 0.05 | " | 230 | less than 15 minutes | a day or more |
| 3 | 1,4-benzoquinone | 0.05 | " | 230 | " | " |
| 4 | Oxalic acid | 0.01 | " | 170 | " | " |
| 5 | EDTA-2Na | 0.02 | " | 220 | " | " |
| 6 | 2,6-pyridine carboxylic acid | 0.005 | " | 190 | " | " |
| 7 | BHT | 0.4 | " | 230 | 15 to 30 minutes | " |
| 8 | P—nitrosophenol | 0.01 | " | 180 | less than 15 minutes | |

TABLE 2

| Sample No. | Stabilizer | Amount of stabilizer added (part by weight) | Fracture torque after 2 hours (kg · cm) | Fracture torque after 24 hours (kg · cm) | Time of gelation at 80° C. |
| --- | --- | --- | --- | --- | --- |
| 9 | Naphtyl azoxine | 0.005 | 170 | 200 | 8 hours or more |
| 10 | Hydroquinone | 0.05 | 170 | 220 | " |
| 11 | 1,4-benzoquinone | 0.05 | 180 | 220 | 80 minutes |
| 12 | Oxalic acid | 0.01 | 175 | 180 | 8 hours or more |

TABLE 2-continued

| Sample No. | Stabilizer | Amount of stabilizer added (part by weight) | Fracture torque after 2 hours (kg · cm) | Fracture torque after 24 hours (kg · cm) | Time of gelation at 80° C. |
|---|---|---|---|---|---|
| 13 | EDTA-2Na | 0.02 | 170 | 210 | " |
| 14 | 2,6-pyridine carboxylic acid | 0.005 | 110 | 190 | " |
| 15 | BHT | 0.4 | 190 | 220 | 40 minutes |
| 16 | P-nitrosophenol | 0.01 | 160 | 170 | 50 minutes |

As apparent from Tables 1 and 2, the formulations containing naphthyl azoxine incorporated therein are substantially not affected in stability and performance by the incorporation of heavy calcium carbonate, but with other stabilizers, the incorporation of heavy calcium carbonate in the formulation results in an extremely degraded stability.

EXAMPLE 2

A formulation was prepared which comprising the following components:

| | Part by weight |
|---|---|
| Bisphenol-A type epoxy acrylate | 80 |
| 2-hydroxyethyl methacrylate | 20 |
| Naphthyl azoxine | 0.005 |
| O—sulfobenzimido | 1 |
| Cumene hydroperoxide | 1 |
| 1,2,3,4-tetrahydroquinone | 0.7 |

Several inorganic filler as given in Table 3 were blended in the above formulation to make samples, and the stability thereof, i.e., fracture torque was determined. The results are given in Table 3.

TABLE 3

| Sample No. | Inorganic filler | Amount of filler added (part by weight) | Fracture torque after 24 hours (kg · cm) | Time of gelation at 80° C. |
|---|---|---|---|---|
| 1 | None | — | 420 | 8 hours or more |
| 2 | Heavy calcium carbonate | 100 | 470 | 7 to 8 hours |
| 3 | Alumina | 100 | 460 | less than 1 hour |
| 4 | Titanium oxide | 100 | 410 | " |
| 5 | Potassium titanate | 30 | 400 | 7 to 8 hours |
| 6 | Talc | 100 | 430 | 5 to 6 hours |
| 7 | Crystallite | 100 | 420 | less than 1 hour |

COMPARATIVE EXAMPLE 1

The naphthyl azoxine in the formulation in Example 2 was replaced by 0.01 part by weight of EDTA-2Na and 0.02 parts by weight of hydroquinone to determine the stability and fracture torque. The results are given in Table 4.

TABLE 4

| Sample No. | Inorganic filler | Amount of filler added (part by weight) | Fracture torque after 24 hours (kg · cm) | Time of gelation at 80° C. |
|---|---|---|---|---|
| 8 | None | — | 420 | 8 hours or more |
| 9 | Heavy calcium carbonate | 100 | 470 | less than 15 minutes |
| 10 | Alumina | 100 | 460 | " |
| 11 | Titanium oxide | 100 | 410 | " |
| 12 | Potassium titanate | 30 | 410 | " |
| 13 | Talc | 100 | 420 | " |
| 14 | Crystallite | 100 | 420 | " |

It will be appreciated from Tables 3 and 4 that when naphthyl azoxine is added as a stabilizer, a higher stability is ensured even if the inorganic fillers are added in a large amount, and particularly in the use of heavy calcium carbonate, potassium titanate and talc, a very high stability is achieved.

EXAMPLE 3

In Table 5, there are given the results of the observation for the effect of naphthyl azoxine as a stabilizer for an anaerobically curable composition. It is apparent from Table 5 that an excellent stability is ensured regardless of the type of a base monomer and without any influence due to the type of an initiator.

TABLE 5

| Sample No. | Base monomer 100 parts by weight | Stabilizer Naphthyl azoxine (part by weight) | Stabilizer EDTA-2Na (part by weight) | Initiator and accelerator Cumene hydroperoxide (part by weight) | Initiator and accelerator n-dodecylmercaptane (part by weight) | Initiator and accelerator 1,2,3,4-tetrahydroquinoline (part by weight) | Heavy calcium carbonate, White B (part by weight) | Effect Time of gelation at 80° C. | Effect Fracture torque after 24 hours (kg/cm) |
|---|---|---|---|---|---|---|---|---|---|
| 1 | A*1 | 0.005 | — | 1.0 | 0.1 | 0.5 | — | 2 hours or more | 60 |
| 2 | " | " | — | " | " | " | 100 | " | 70 |
| 3 | " | — | 0.01 | " | " | " | — | " | 60 |
| 4 | " | — | " | " | " | " | 100 | less than 10 minutes | 70 |
| 5 | B*2 | 0.005 | — | " | " | " | — | 2 hours or more | 100 |
| 6 | " | " | — | " | " | " | 100 | " | 130 |

TABLE 5-continued

| Sample No. | Base monomer 100 parts by weight | Stabilizer Naphthyl azoxine (part by weight) | EDTA-2Na (part by weight) | Initiator and accelerator (part by weight) | | | Heavy calcium carbonate, White B (part by weight) | Effect | |
|---|---|---|---|---|---|---|---|---|---|
| | | | | Cumene hydro-peroxide | n-dodecyl-mercaptane | 1,2,3,4-tetrahy-droqui-noline | | Time of gelation at 80° C. | Fracture torque after 24 hours (kg/cm) |
| 7 | " | — | 0.01 | " | " | " | — | " | 100 |
| 8 | " | — | " | " | " | " | 100 | less than 10 minutes | 130 |
| 9 | C*3 | 0.005 | — | — | 0.2 | 0.3 | — | " | 80 |
| 10 | " | " | — | — | " | " | 100 | " | 100 |
| 11 | " | — | 0.01 | — | " | " | — | " | 80 |
| 12 | " | — | " | — | " | " | 100 | less than 10 minutes | 100 |

*1 A is spiran acrylate (T-503 X-IN available from Showa Highpolymer Co., Ltd.)
*2 B is polybutadiene-modified methacrylate (EFN-1250HMXC available from Showa Highpolymer Co., Ltd.)
*3 C is trimethylol propane trimethacrylate

EXAMPLE 4

The various amounts of naphthyl azoxine added were used to determine the stability, and the results are given in Table 6.

The composition is applied in an amount sufficient to fill the clearance between the test pieces (i.e., between the bolt and the nut), and after assembling the bolt and the nut under a nonclamped condition, is cured for a period of 2 or 24 hours at 25 C. Thereafter, the nut is

TABLE 6

| Base monomer | | Amount of naphthyl azoxine added per 100 parts by weight of base monomer (part by weight) | | | | | | | |
|---|---|---|---|---|---|---|---|---|---|
| | | 0.0001 | 0.0005 | 0.001 | 0.005 | 0.05 | 0.1 | 0.5 | 0.8 |
| Triethylene glycol dimethacrylate, 100 parts by weight | Stability (Time of gelation at 80° C.) | less than 30 minutes Δ | 2 to 3 hours O | 3 hours or more O | ← O | ← O | ← O | ← O | ← O |
| | Time to complete curing | 2 to 3 hours O | 12 hours O | ← O | ← O | 24 hours O | ← O | 48 hours or more O | 3 days or more × |
| 2,2-bis [4-(methacryloxy-diethoxy) phenyl] propane dimethacrylate, 100 parts by weight | Stability (Time of gelation at 80° C.) | less than 30 minutes Δ | 1 to 2 hours O | 3 hours or more O | ← O | ← O | ← O | ← O | ← O |
| | Time to complete curing | 2 to 3 hours O | 12 hours O | ← O | 24 hours O | ← O | ← O | 48 hours or more O | 3 days or more × |

The initiator, accelerator and filler is as follows:
Cumene hydroperoxide 1 part by weight
0-sulfobenzimido 1 part by weight
1,2,3,4,-tetrahydroquinoline 0.5 parts by weight
Heavy calcium carbonate (White B) 100 parts by weight As apparent from Table 6, the amount of naphthyl azoxine added in a range of 0.0005 to 0.5 part by weight provides an effect as a stabilizer for the anaerobically curable composition.

EXAMPLE 5

Table 7 shows the improvement of compressive strength by the addition of inorganic fillers.

TABLE 7

| Base monomer 100 parts by weight | Compressive strength, kg/cm² | | |
|---|---|---|---|
| | Absence of filler | Calcium carbonate 100 parts by weight | Cristallite 100 parts by weight |
| Bisphenol A type epoxyacrylate | 900 | 1200 | 1400 |
| Urethane acrylate | 800 | 1500 | 900 |

TESTING PROCEDURE

The determination of fracture torque is conducted using a steel bolt of JISB1180 (hexagon headed bolt) M10 having a nominal length of 20 mm and one or two types of steel nuts of JISB1180 (hexagonal headed nut), which were not subjected to a surface treatment. The degreasing is conducted using a chlorine-containing solvent.

continuously turned toward the loosening to determine the torque at the fracture of the cured composition using a torque meter.

For the test of stability by the determination of the time of gelation at 50 C. and 80 C., 250 g of a composition is placed into a polyethylene vessel and left to stand in a drier at 50 C. or 80 C. to determine the time up to the gelation of the composition.

The measurement of compressive strength is conducted according to the JISK6911 procedure.

As described above, a naphthyl azoxine is used as a stabilizer in a composition according to the present invention. Therefore, even if an inorganic filler is provided in the composition in an amount of about 50% by weight, not only a good stability in storage but also a rapid curability are still ensured, and the cured material has a high mechanical strength, thus making it possible to provide an anaerobically curable composition which is extremely useful for practical use, primarily as an adhesive.

I claim:

1. An anaerobically curable composition having a good stability and suitable for use, primarily as an adhesive, which comprises a compound which is a radically polymerizable acrylate and/or methacrylate monomer terminally having one or more polymerizable ethylenically double bonds, a naphthyl azoxine having a structure of

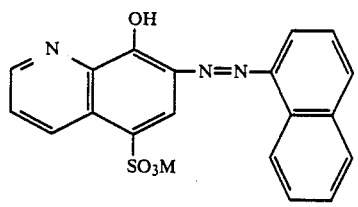

wherein M is H or Na, an inorganic filler selected from the group consisting of heavy calcium carbonate, alumina, titanium oxide, potassium titanate, talc and crystallite, in an amount at least equal to ten percent of the total weight, and not in excess of the amount which would unsuitable degrade the stability of the composition.

2. The composition as claimed in claim 1, wherein said compound is poly-(meth)acrylate represented by the general formula:

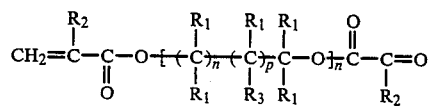

wherein $R_1$ is hydrogen, or selected from the groups consisting of an alkyl group containing 1 to 4 carbon atoms, hydroxyl alkyl containing 1 to 4 carbon atoms, or

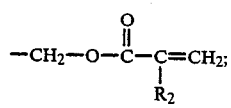

$R_2$ is H or —$CH_3$; and $R_3$ is H or selected from hydroxyl and

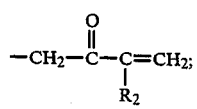

and wherein m is an integer of 1 or more, preferably 1 to 8; n is an integer of 1 or more, preferably 1 to 10; and p is 0 or 1.

3. The composition as claimed in claim 1, wherein said compound is mono-(meth)acrylate represented by the general formula:

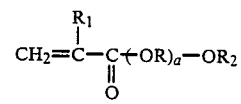

wherein R is an alkylene containing 2 to 4 carbon atoms or a halo-substituted alkylene; $R_1$ is H or $CH_3$; $R_2$ is selected from the group consisting of —$CH_2CH_2OH$, —$CH_2CH_2CH_2OH$,

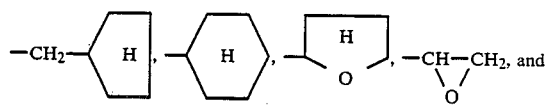

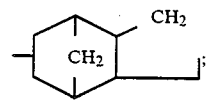

and a is an integer of 0 to 7 inclusive.

4. The composition as claimed in claim 1, wherein said compound is (meth)acrylate represented by the general formula:

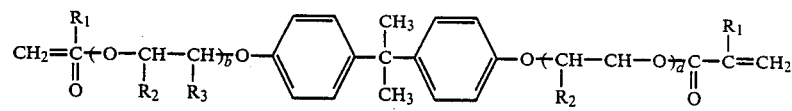

wherein $R_1$ is H or $CH_3$; $R_2$ and $R_3$ are H, an alkyl or alkoxyl group, or a halogen atom; and b and c are an alkylene group containing 1-8 carbon atoms.

5. The composition as claimed in claim 1, wherein said compound is urethane(meth)acrylate having

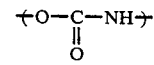

in a molecule.

6. The composition as claimed in claim 1, wherein said compound is (meth)acrylate having, in a molecule, a spiroacetal structure:

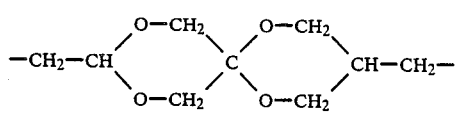

7. The composition as claimed in claim 1, wherein said compound is a monomer selected from the group consisting of (meth)acrylates modified by acrylonitrile butadiene or having an acrylonitrile butadiene structure, and (meth)acrylates modified by butadiene or having an epoxy structure.

8. The composition as claimed in claim 1, wherein said naphthyl azoxine is added in an amount ranging from 0.0005 to 0.5 parts by weight to 100 parts by weight of said acrylate and/or methacrylate monomer.

9. A composition according to claim 1 in which said percent is greater than ten and less than fifty.

* * * * *